June 16, 1925.  
O. EVANS  
BOLT  
Filed Aug. 12, 1922
1,542,682
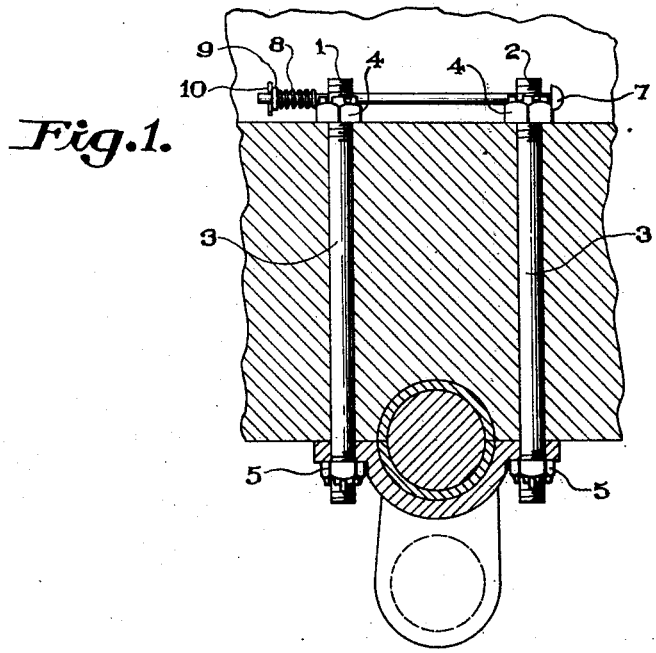
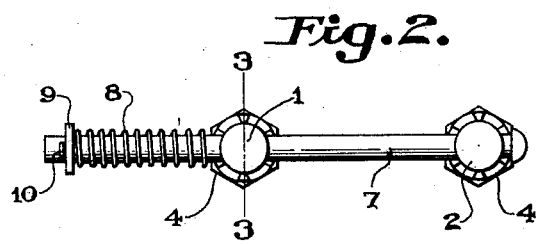
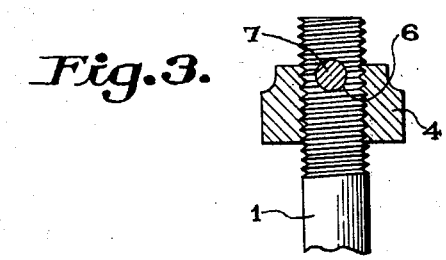
Owen Evans INVENTOR
WITNESS: H. A. LaClair
BY Victor J. Evans ATTORNEY Patented June 16, 1925.

1,542,682

UNITED STATES PATENT OFFICE.

OWEN EVANS, OF BINGER, OKLAHOMA.

BOLT.

Application filed August 12, 1922. Serial No. 581,476.

*To all whom it may concern:*

Be it known that I, OWEN EVANS, a citizen of the United States, residing at Binger, in the county of Caddo and State of Oklahoma, have invented new and useful Improvements in Bolts, of which the following is a specification.

The front and center main bearing bolts on the Ford motor only have nuts on one end, and due to the construction of the motor, it is impossible to insert the bolts from the top so that the nuts will be down. To tighten these bolts from the bottom requires the services of two men, one to hold the nut from the top and the other to turn the bolt from the bottom.

It is the object of the present invention to produce a means whereby these bolts shall be self-sustaining, so that the nuts can be screwed thereon in an easy manner by a single operator.

The drawing, which accompanies and which forms part of this application, illustrates a satisfactory reduction of the improvement to practice, and wherein:—

Figure 1 is a view of a sufficient portion of an engine motor to illustrate the application of the improvement, parts being broken away and parts being in section.

Figure 2 is a top plan view of the improvement.

Figure 3 is a sectional view on the line 3—3 of Figure 2.

Referring now to the drawing in detail, the numerals 1 and 2 designate bolts which, as illustrated in Figure 1 of the drawing are designed to be received through openings in a motor casing 3. The bolts 1 and 2 represent the front and center main bearing bolts for the motor. The bolts in the present instance have both of their ends threaded.

Designed to be screwed on the ends of the bolts are castellated nuts 4 and 5 respectively. The upper ends of the bolts are provided with round openings 6 which are designed to align, and through these openings there is passed a headed pin 7. The pin is designed to be received in the notches on the upper ends of the nuts 4. The pin has its non-headed end provided with one or more apertures. Over this end of the pin there is arranged a helical spring 8 that is in contact with one of the nuts 4. In contact with the opposite end of the spring there is a washer 9 which, of course, is arranged on the bolt, and passing through one of the referred to apertures in the end of the pin there is a cotter pin 10 which holds the spring on the pin. The bolts 3 may be passed through the openings provided therefor after the nuts 4 and the pin 7 have been associated with the said nuts. This materially facilitates the application of the bolts. The pin, of course, prevents the turning of the nuts 4. The spring will take up all lost motion and prevent wear from vibration between the cotter pin and the washer. The lower nuts 5 may be readily screwed on the bolts. The lower ends of the bolts are provided with openings through which pass the cotter pins. The openings through which the cotter pins pass are of a size to permit of the passage of the pins 7 therethrough, so the pin can be inserted through either end of the bolts.

It is, of course, to be understood that the improvement may be successfully employed as a holding means for two or more bolts that are not necessarily provided with castellated nuts at both ends.

It is believed that the foregoing description, when taken in connection with the drawing will fully set forth the construction and advantages of the improvement to those skilled in the art to which this invention relates.

Having described the invention, I claim:

A pair of bolts for connecting bearings of a motor casing, each of which having oppositely threaded ends and one end of each bolt having oppositely threaded ends and one end of each bolt having an opening therethrough, castellated nuts screwed on the ends of the bolts, a pin passing through the referred to openings in the bolts and received in the castellations of the nuts adjacent thereto, a spring on the pin contacting with one of the nuts and influencing the pin to cause the head thereof to contact with the nut on the opposite bolt, and means holding the spring on the pin.

In testimony whereof I affix my signature.

OWEN EVANS.